United States Patent
Goergen et al.

(10) Patent No.: US 12,524,971 B2
(45) Date of Patent: *Jan. 13, 2026

(54) MODULAR AUGMENTED AND VIRTUAL REALITY RIDE ATTRACTION

(71) Applicant: Universal City Studios LLC, Universal City, CA (US)

(72) Inventors: Patrick John Goergen, Orlando, FL (US); Danielle Marie Holstine, Winter Garden, FL (US); Tomas Manuel Trujillo, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,948

(22) Filed: Jul. 17, 2023

(65) Prior Publication Data

US 2024/0046579 A1 Feb. 8, 2024

Related U.S. Application Data

(63) Continuation of application No. 18/079,648, filed on Dec. 12, 2022, now Pat. No. 11,741,680, which is a
(Continued)

(51) Int. Cl.
*G06T 19/00* (2011.01)
*A63F 13/211* (2014.01)
(Continued)

(52) U.S. Cl.
CPC .......... *G06T 19/006* (2013.01); *A63F 13/211* (2014.09); *A63F 13/26* (2014.09);
(Continued)

(58) Field of Classification Search
None
See application file for complete search history.

(56) References Cited

U.S. PATENT DOCUMENTS 6,179,619 B1 * 1/2001 Tanaka .................. A63G 7/00
472/60
9,463,379 B1 * 10/2016 Brister .................. A63F 13/42
(Continued)

FOREIGN PATENT DOCUMENTS

JP H10309381 A 11/1998
JP 2002544689 A 12/2002
(Continued)

OTHER PUBLICATIONS

PCT International Search Report and Written Opinion for PCT Application No. PCT/US2019/052950 Mailed Feb. 3, 2020, 19 Pages.
(Continued)

*Primary Examiner* — Tapas Mazumder
(74) *Attorney, Agent, or Firm* — Fletcher Yoder, P.C.

(57) ABSTRACT

An amusement park system includes a modular attraction system having a ride vehicle having seats to accommodate passengers, an on-board system integrated with the ride vehicle and having on-board game systems connected via a network. Each on-board game system is configured to provide an augmented reality (AR) experience, or a virtual reality (VR) experience, or both, via a respective visual experience generator device. The AR experience, or the VR experience, or both, is provided within a game shared between the on-board game systems. The on-board game systems are integrated into the ride vehicle, and are connected via the network to one another in a manner that allows for ready removal of all or a portion of one of the on-board game systems without affecting operation of the remaining on-board game systems.

24 Claims, 8 Drawing Sheets

Related U.S. Application Data continuation of application No. 16/580,543, filed on Sep. 24, 2019, now Pat. No. 11,562,539.

(60) Provisional application No. 62/736,433, filed on Sep. 25, 2018.

(51) Int. Cl.
*A63F 13/26* (2014.01)
*A63F 13/843* (2014.01)
*G06F 3/01* (2006.01)
*H04L 67/12* (2022.01)

(52) U.S. Cl.
CPC ............ *A63F 13/843* (2014.09); *G06F 3/011* (2013.01); *H04L 67/12* (2013.01)

(56) References Cited

U.S. PATENT DOCUMENTS

| | | |
|---|---|---|
| 9,839,857 B2 | 12/2017 | Wagner |
| 2013/0030645 A1 | 1/2013 | Divine et al. |
| 2013/0165215 A1 | 6/2013 | Arezina et al. |
| 2016/0046305 A1 | 2/2016 | Cylvick |
| 2017/0021282 A1 | 1/2017 | Comploi |
| 2017/0236328 A1 | 8/2017 | Eatedali et al. |
| 2017/0323482 A1 | 11/2017 | Coup et al. |
| 2018/0217966 A1* | 8/2018 | Buttolo ................... H04L 67/12 |
| 2018/0250589 A1 | 9/2018 | Cossairt et al. |
| 2018/0253141 A1 | 9/2018 | McCracken |
| 2018/0253905 A1 | 9/2018 | McCracken et al. |
| 2018/0255285 A1 | 9/2018 | Hall et al. |
| 2018/0345154 A1* | 12/2018 | Thomas ................... E04H 14/00 |
| 2019/0004598 A1 | 1/2019 | Gordt et al. |

FOREIGN PATENT DOCUMENTS

| | | |
|---|---|---|
| JP | 2010172593 A | 8/2010 |
| JP | 2017107604 A | 6/2017 |
| JP | 2018073172 A | 5/2018 |

OTHER PUBLICATIONS

JP Office Action for Japanese Application No. 2021-514028, mailed Aug. 31, 2023.
AE Office Action for United Arab Emirates Application No. P6000423/2021 mailed Aug. 15, 2024.
JP Office Action for Japanese Application No. 2024-024360 mailed Feb. 27, 2025.

* cited by examiner

MODULAR AUGMENTED AND VIRTUAL REALITY RIDE ATTRACTION

CROSS-REFERENCE TO RELATED APPLICATION

This application is a continuation of U.S. patent application Ser. No. 18/079,648, entitled "MODULAR AUGMENTED AND VIRTUAL REALITY RIDE ATTRACTION," filed Dec. 12, 2022, which is a continuation of U.S. patent application Ser. No. 16/580,543, now U.S. Pat. No. 11,562,539, entitled "MODULAR AUGMENTED AND VIRTUAL REALITY RIDE ATTRACTION," filed Sep. 24, 2019, which claims priority from and the benefit of U.S. Provisional Application Ser. No. 62/736,433, entitled "MODULAR AUGMENTED AND VIRTUAL REALITY RIDE ATTRACTION," filed Sep. 25, 2018, which are hereby incorporated by reference in their entireties for all purposes.

BACKGROUND

The subject matter disclosed herein relates to amusement park attractions, and more specifically, to providing augmented experiences, virtual reality experiences, or both, in amusement park attractions.

Amusement parks or theme parks may include various attractions to provide entertainment to guests (e.g., families and/or people of all ages). For example, the attractions may include a ride, such as a roller coaster, a stationary ride with a motion platform, a dark ride, and so forth. In addition, there may be themed environments along the rides. Such themed environments may be traditionally established using equipment, furniture, building layouts, props, decorations, and so forth. Depending on the complexity of the themed environment, it could prove to be very difficult and time-consuming to setup and replace the themed environment. It may also be very difficult to setup a themed environment that is entertaining for all passengers on the ride. For example, the same themed environment may be appealing to some passengers, but not others.

In addition, as entertainment technology continues to improve in a variety of settings, such as through developments in the video gaming and movie industries, guests may begin to expect more immersive experiences reflective of state of the art technologies. Depending on the complexity and the level of usage of certain amusement attractions, some of which serve thousands of guests every day, it may be very difficult to modify, upgrade, replace, or maintain functionalities of such attractions.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, an amusement park system includes a modular attraction system having a ride vehicle having seats to accommodate passengers, an on-board system integrated with the ride vehicle and having on-board game systems connected via a network. Each on-board game system is configured to provide an augmented reality (AR) experience, or a virtual reality (VR) experience, or both, via a respective visual experience generator device. The AR experience, or the VR experience, or both, is provided within a game shared between the on-board game systems. The on-board game systems are integrated into the ride vehicle, and are connected via the network to one another in a manner that allows for ready removal of all or a portion of one of the on-board game systems without affecting operation of the remaining on-board game systems.

In another embodiment, a modular amusement park ride vehicle includes a body having a passenger compartment and seats to accommodate passengers, and on-board game systems each associated with a respective seat to allow each passenger of the modular amusement park ride vehicle to participate in an augmented reality (AR) and/or virtual reality (VR) game shared between the on-board game systems. Each on-board game system includes a gaming computer configured to render AR or VR graphics, and a head-mounted display (HMD) in communication with the gaming computer and configured to display the AR or VR graphics. The vehicle also includes an on-board game server configured to coordinate communication with the on-board game systems via an on-board network switch individually connected to the on-board game systems, and a vehicle show supervisor (VSS) communicatively coupled to the on-board game server and configured to receive game inputs from the passengers relating to the AR and/or VR game. The VSS is configured to relay the game inputs to the on-board game server via the on-board network switch.

In another embodiment, an amusement park attraction system includes an on-board system integrated with a ride vehicle. The on-board system has a visual experience generator device for each seat in the ride vehicle, and the on-board system is configured to provide an augmented reality (AR) experience, virtual reality (VR) experience, or both, within a shared game via at least the visual experience generator devices. The amusement park attraction system also includes an off-board system communicatively coupled to the on-board system via a network and having off-board show devices positioned off of the ride vehicle. The off-board system includes an off-board game server communicatively coupled to the off-board show devices and configured to coordinate operation of the off-board show devices with AR or VR events occurring during the shared game.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
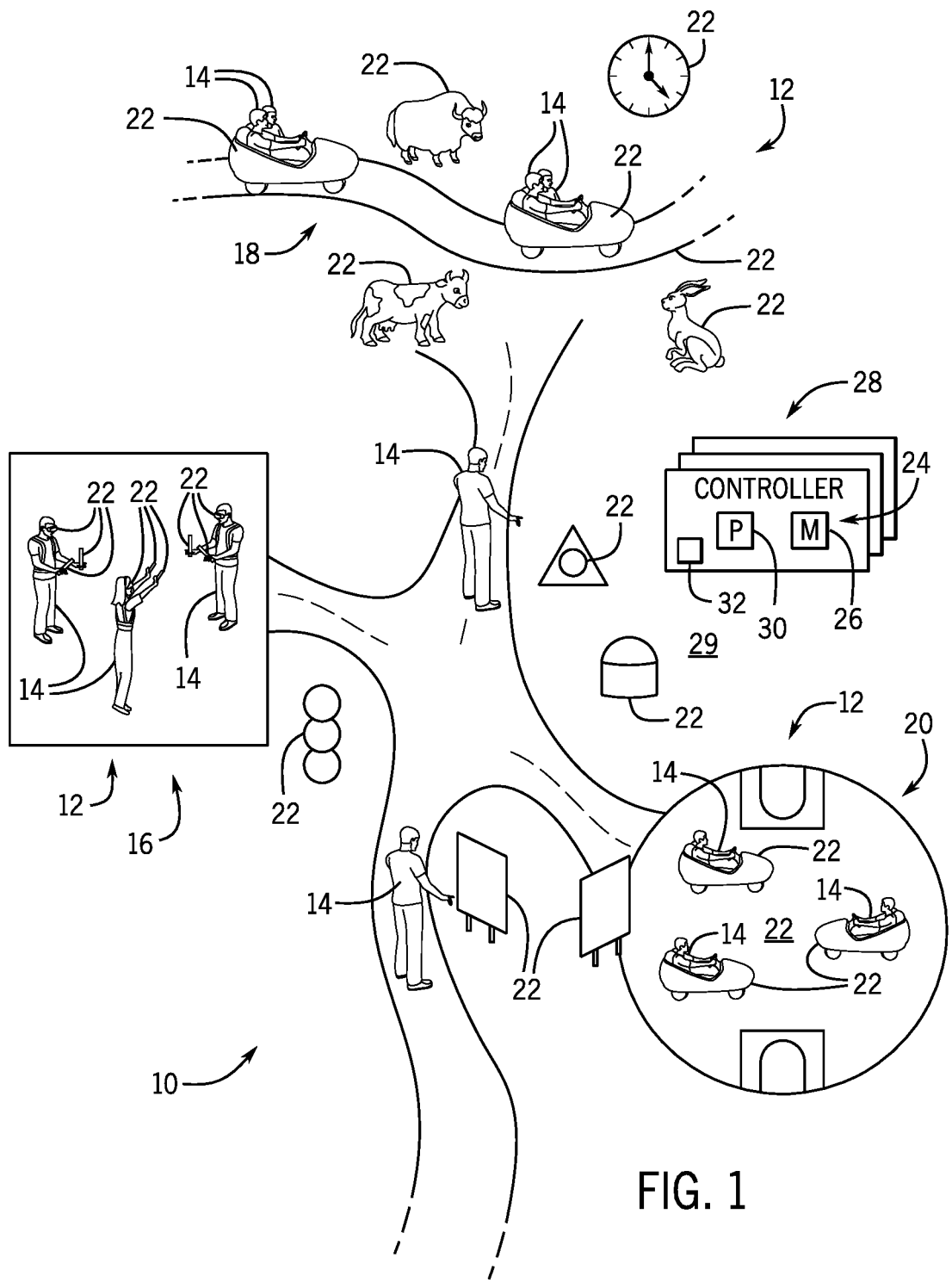
FIG. 1 is a schematic view of an embodiment of an amusement park having a modular architecture, in accordance with certain aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It is now recognized that it is desirable to include attractions where it may be possible to change attraction themes in a flexible and efficient manner relative to traditional techniques. It is also now recognized that it may be desirable to provide attraction features that readily allow upgrades, maintenance, or replacement of key components in a manner that does not create significant attraction downtime. Indeed, as one example, theme park attractions using ride vehicles have historically had long lead times associated with technical refresh upgrades. Thus, cutting edge technology (e.g., augmented or virtual reality) within these attractions can easily be outpaced by what is available in home consumer products.

It is presently recognized that a need exists for, among other things, amusement attractions (e.g., ride vehicle systems) to be designed in a way that allows ready integration of technical refreshes, particularly those that follow initial integration of cutting edge technologies. For instance, it is now recognized that a need exists for amusement ride designs that allow updates to be performed agnostically and rapidly for both software and hardware, with minimal impacts to ride aesthetics and operations. To address these and other concerns, the present disclosure provides an architecture that encompasses hardware and software to ensure either can be updated with minimal negative impact to the system.

As one example embodiment of the present disclosure, an amusement park attraction may include a modular attraction system. The modular attraction system may incorporate an on-board system (e.g., on a ride vehicle) that drives an on-board experience (e.g., an experience local to a user and/or the ride vehicle). For example, the on-board system may provide gaming effects resulting in an augmented reality and/or virtual reality (AR/VR) experience, which may include a visual experience presented by way of one or more display features (e.g., head mounted displays (HMDs)). The modular attraction system may also include an off-board system (e.g., off the ride vehicle) that coordinates certain aspects of various components of the on-board system, and provides other entertainment experiences using light systems, animatronics, media systems (e.g., projection display systems and sound systems), or a combination thereof, associated with the particular amusement park attraction. The on-board and off-board systems may operate collaboratively to enhance the ride experiences of the passengers. In addition, the on-board and off-board systems and their various components are designed in such a way that they may be individually or separately replaced, maintained, modified, upgraded and so forth, with minimal downtime of the amusement park attraction.

The terms "on-board system" and "off-board system" are used herein to denote two systems that work together to create an overall experience in the amusement park attraction, and it should be appreciated that components of these systems are not necessarily intended to be limited to any particular placement relative to the ride vehicle. For example, in one implementation discussed in detail herein, all of the components of the on-board system may be located on the ride vehicle (e.g., move with the ride vehicle), while all of the components of the off-board system may be located off the ride vehicle (e.g., do not move with the ride vehicle). However, the on-board system may additionally or alternatively include components that are co-located with the ride vehicle (e.g., components that are not located on the ride vehicle, but are in proximity of the ride vehicle during at least a portion of the ride). For example, at least some components of the on-board system may be positioned at a location along a path traversed by the ride vehicle, and these components of the on-board system may communicate (e.g., via a wireless network) with other components of the on-board system that are located on the ride vehicle when the ride vehicle is at or near the location along the path to drive the on-board experience. As another example, the ride vehicle may not physically travel along a path (e.g., may be stationary; move in place, such as rock or rotate without traveling along a path). In some such cases, at least some components of the on-board system may be positioned at a location proximate to the ride vehicle, and these components of the on-board system may communicate (e.g., via a wireless network) with other components of the on-board system that are located on the ride vehicle to drive the on-board experience.

In yet another example, the attraction may not include a ride vehicle, but instead the user may walk or otherwise travel through the attraction wearing or carrying one or more interactive components, such as the one or more display features (e.g., the HMD), speakers, and/or haptics. In some such cases, all of the components of the on-board system may be worn or carried by the user (e.g., move with the user), while all of the components of the off-board system may be located off of the user (e.g., do not move with the user). However, the on-board system may additionally or alternatively include components that are co-located with the user (e.g., components that are not worn or carried by the user, but are in proximity of the user during at least a portion of the amusement park attraction). In some such cases, at least some components of the on-board system may be positioned at a location along a path traversed by the user or otherwise proximate to the user, and these components of the on-board system may communicate (e.g., via a wireless network) with other components of the on-board system that are worn or carried by the user when the user is at or near the location along the path to drive the on-board experience.

Additionally or alternatively, the on-board system may include components that are located remotely from the ride vehicle and the user (e.g., at any location, including outside of physical boundaries of the amusement park attraction), but may communicate (e.g., via a wireless network) with other components of the on-board system that are physically located on the ride vehicle or worn or carried by the user to create the on-board experience, for example. Furthermore, the off-board system may include components (e.g., distinct from the components of the on-board system) that work together with the components of the on-board system to create the overall experience. For example, the off-board system may include components that drive off-board experiences, such as fog, smoke, wind, and/or lights, in an environment surrounding the ride vehicle and/or the user within the amusement park attraction.

While certain embodiments discussed in detail herein include a visual experience presented via HMDs to facilitate discussion, it should be appreciated that the AR/VR experience may additionally or alternatively include a visual experience presented via any other suitable technology, such as via any other suitable visual experience generator (e.g., a hand-held display, a vehicle-mounted display, a virtual retina display or retinal projector that projects onto a retina of the user) that is capable of generating a visual representation that can be visualized by the user. For example, the HMDs disclosed herein may be replaced with or used in conjunction with any other suitable visual experience generator. Additionally, the AR/VR experience may include the visual experience, an auditory experience presented by way of one or more speaker features, and/or a tactile experience presented by way of one or more haptic features. In some embodiments, the AR/VR experience may include only an auditory experience or only a tactile experience.

With the foregoing in mind, FIG. 1 illustrates an embodiment of an amusement park 10, which may include one or more attractions 12. Each attraction 12 may accommodate a plurality of users 14 (e.g., guests, patrons). As discussed herein, the amusement park 10 may utilize a multi-layer system infrastructure to accommodate technological refreshes, updates, and so forth, while minimizing downtime and impact of overall aesthetics and operations of the amusement park 10. Particularly, modularity of the multi-layer system infrastructure may provide for a change (e.g., an update, a replacement, an addition, and/or a removal) of one or more hardware or software components without substantially affecting other elements (e.g., other hardware or software components) of the system.

To illustrate, in certain embodiments, the amusement park 10 may include a first attraction 16, a second attraction 18, and a third attraction 20. However, it should be understood that the amusement park 10 may include any suitable number of attractions 12. Each attraction 12 may include any suitable number of hardware components 22, such as physical components that may use and interact (e.g., communicate) with software components 24, which may be stored in a memory device 26 of one or more controllers 28 to perform tasks associated with a particular attraction 12, as discussed in further detail herein. Indeed, there may be any suitable number of controllers 28. In certain embodiments, each attraction 12 may be associated with a respective controller 28. The amusement park 10 may further include one or more hardware components 22 within an environment 29 (e.g., queues) of the amusement park 10, which may also be communicatively coupled to the one or more controllers 28. In certain embodiments, the environment 29 may include the attractions 12.

The controller 28 may employ a processor 30, which may represent one or more processors, such as an application-specific processor. The controller 28 may also include the memory device 26 for storing instructions executable by the processor 30 to perform the methods and control actions of the amusement park 10 as described herein. The processor 30 may include one or more processing devices, and the memory 26 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium that can be used to carry or store desired program code in the form of machine-executable instructions or data structures and that may be accessed by the processor 30 or by any general purpose or special purpose computer or other machine with a processor.

The controller 28 may be communicatively coupled to elements of the amusement park 10 through a communication system 32. In some embodiments, the communication system 32 may communicate wirelessly. By way of non-limiting example, such communication may involve a wireless network (e.g., wireless local area networks [WLAN], wireless wide area networks [WWAN]), near field communication [NFC], or Bluetooth. Additionally or alternatively, the communication system 32 may use wired communication, such as a wired network including a local area network [LAN], or wide area network [WAN].

Each hardware component 22 (e.g., peripheral device) may be categorized as an input device and/or an output device. That is, each hardware component 22 may be an input device, an output device, or an input/output device. An input device may receive an input, such as from one of the plurality of users 14, and send input signals indicative of the received input to the controller 28. The hardware components 22 may include interactive components, and the input may be received via one or more user input devices (e.g., buttons, knobs, touchscreens, joysticks, actuatable elements, steering controls, triggers) of the interactive components. Correspondingly, and as a result of the input signals, the output devices may receive the input signals, which may be received from the controller 28 and/or directly from the input devices. For example, the controller 28 may then, in turn, send one or more signals to one or more locations, such as the output devices, within the amusement park 10 to provide an appropriate response according to the received input. The output devices may react accordingly to the signal, such as through actuation of a device or through display of images/information via a display device or via any suitable visual experience generator. For example, with regard to hardware components 22 of the first attraction 16, input devices may include AR/VR devices, such as AR/VR tools and head mounted displays (HMDs), and output devices may include the HMDs as images are displayed via the HMDs.

With regard to the hardware components 22 of the second attraction 18, input devices may include ride devices (e.g., tools) that the users 14 may interact with during a ride cycle and output devices may include animatronic show pieces and ride vehicles. With regard to the hardware components 22 of the third attraction 20, input devices may include steering wheels and output devices may include a scoreboard, and a game floor display. However, it is to be understood that the amusement park 10 may include any suitable number of attractions 12 with any suitable number and type of hardware components 22. Further, AR/VR devices may serve as input/output devices that facilitate user interaction with the attraction 12 to generate the input and cause another hardware element to output a response. In turn, the response may also trigger output changes to the AR/VR devices (e.g., to the display of the AR/VR devices).

Each of the hardware components 22 and software components 24 may be replaced or updated based on various factors. For example, emerging technologies, movies or other media releases, seasonal change, time of day, routine maintenance, or any combination thereof may motivate a change to the hardware components 22 and/or software components 24 of the amusement park 10. When a component (e.g., a hardware component 22 or a software component 24) is introduced, updated, or otherwise changed within the amusement park 10, the component may be registered with the amusement park 10 such that the component may interact (e.g., communicate) with other components of the amusement park 10. That is, the one or more controllers 28 may include various protocols to send and receive information to and from components of the amusement park 10 as discussed in further detail with reference to FIG. 2.

Figure 2:
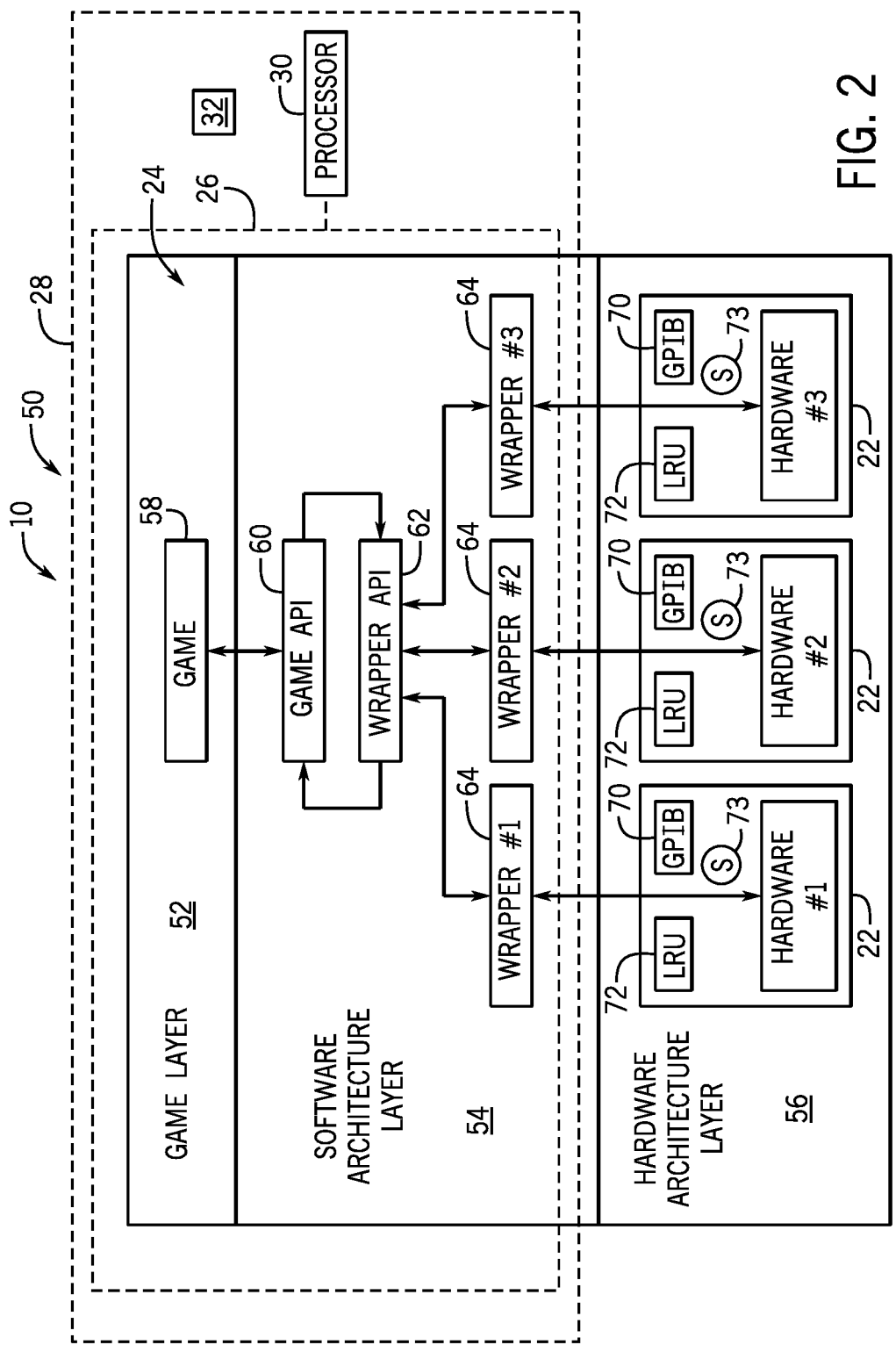
FIG. 2 is a block diagram of an embodiment of the modular architecture that may be used in the amusement park of FIG. 1, in accordance with certain aspects of the present disclosure.

Each of the attractions described with respect to FIG. 1 may include modular components that form all or part of a modular attraction system as previously discussed. To illustrate an example of the manner in which such a system may be implemented, FIG. 2 is a block diagram of a system architecture of a modular attraction system 50 of the amusement park 10. The modular attraction system 50 may be separated into a game layer 52, a software layer 54 (e.g., a software architecture layer), and a hardware layer 56 (e.g., a hardware architecture layer). The game layer 52 and the software layer 54 may each be stored within the memory 26 of the controller 28. The game layer 52 and the software layer 54 may be communicatively coupled to the hardware layer 56 via the communication system 32. The game layer 52 may include a game logic 58, which determines logic of when an attraction 12 interacts with, changes, and/or manipulates elements (e.g., hardware components 22 and/or software components 24) of the attractions 12. That is, the game layer 52 may operate and execute game logic 58.

The software layer 54 may include one or more game application programming interfaces (APIs) 60, one or more wrapper APIs 62, and multiple wrappers 64. The game API 60 may define an interface language set that any game implementation (e.g., game logic 58 of a particular attraction 12) can use to communicate with the software layer 54 and the hardware layer 56. For example, the game logic 58 may communicate with the game API 60 to trigger various environmental stimuli (e.g., reactions carried out through the hardware components 22) within the amusement park 10.

The wrapper API 62 may route messages from the game API 60 to the wrappers 64. The wrappers 64 are software elements that conform, extend, and/or implement a standard interface class and are configured to register with the wrapper API 62 to receive the messages associated with the environmental stimuli. The wrappers 64 may communicate with a driver associated with a particular hardware component 22 so that the hardware component 22 may receive the messages associated with environmental stimuli. In certain embodiments, each hardware component 22 may be associated with one or more respective wrappers 64. The wrappers 64 may serve as a buffer between the hardware components 22 of the hardware layer 56 and the software components 24 of the software layer 54. For example, when the hardware components 22 are updated or changed, the change or update will not impact operations, logic, and/or builds of the software components 24. Conversely, as software components 24 are updated, the wrappers 64 may reduce and/or prevent the need to update the hardware components 22 to be compatible with the updated software components 24. In certain embodiments, additional hardware components 22 or features may be added. In such embodiments, one or more wrappers 64 associated with the newly added hardware components may also be added to the software layer 54. The newly added wrappers 64 may then be registered with the wrapper API 62 to allow proper communication of signals (e.g., messages, events).

The hardware layer 56 may include the hardware components 22 which, as discussed herein, are configured to be readily replaceable and/or updatable. That is, the hardware components 22 may utilize a modular design (e.g., composed of standardized units), standard (e.g., universal) mounting points, and dynamic internal configurations to improve implementation of new hardware components 22 and updates to existing hardware components 22. For example, the hardware components 22 may utilize a general purpose interface bus (GPIB) 70 (e.g., general purpose interface (GPI)), which may form part of the communication system 32, to communicate with components within the software layer 54 and other hardware components 22 within the hardware layer 56. Indeed, in certain embodiments, the hardware components 22 may utilize wired and/or wireless communication. In some embodiments, the hardware components 22 may communicate without the use of a network, such as by direct or broadcast communications through wired and/or wireless means.

As a further example, the hardware components 22 may utilize and/or be a line replaceable unit (LRU) 72, which is a modular component that is readily replaceable at the operating location of the unit. Particularly, the LRU 72 may be quickly replaced at the attraction 12 (e.g., "on the line"), which may provide for decreased downtime of the attraction 12. Indeed, the hardware components 22 within the hardware layer 56 may utilize, for example, a limited number (e.g., one) of standards associated with various components, such as power supply standards, input and output module standards, and others. In this manner, if a portion (or all) of a hardware component 22 should be added or changed, the portion may easily be implemented due at least in part to the standard (e.g., general, universal, modular) components. The modular design of the hardware components 22 may be based on standards, guidelines, and best practices to ensure correct implementation. In certain embodiments, the hardware components 22 may provide self-testing. That is, the hardware component 22 may determine if it is suitable to continue operation. For example, the hardware component 22 may include one or more sensors 73 configured to monitor inputs and outputs of the hardware component 22 to determine the operational status of the hardware component 22, such as whether the hardware component 22 is operating as intended and/or if a part within the hardware component 22 should be replaced/updated, such as if the hardware component 22 is nearing an end of its product lifecycle.

Figure 3:
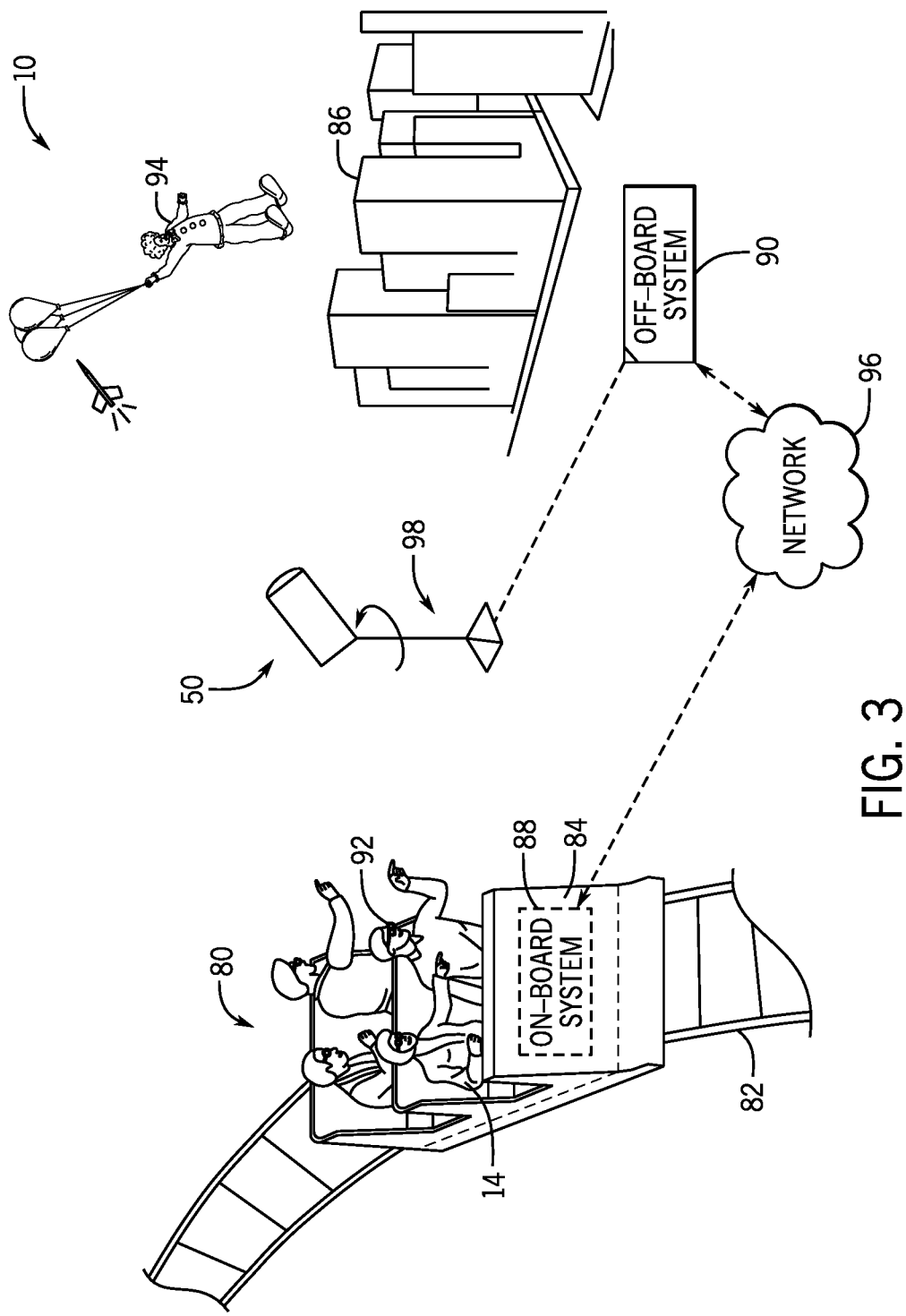
FIG. 3 is a perspective view of an embodiment of a modular attraction system that includes a ride vehicle with an on-board system that coordinates with an off-board system to provide augmented reality and/or virtual reality (AR/VR) experiences, in accordance with certain aspects of the present disclosure.

An example embodiment of the modular attraction system 50 within the amusement park 10 is shown schematically in FIG. 3. As illustrated, the amusement park 10 may include a ride 80 as the second attraction 18. The ride 80 may be positioned within the environment 29 having various features, such as fixed equipment, building layouts, props, decorations, and so forth, corresponding to a theme. In certain embodiments, the ride 80 may include a dark ride or other similar thrill ride, and may include a ride path 82 (e.g., a closed-loop track or a system of closed-loop tracks to support forward and/or rearward motion of a ride vehicle 84 along the ride path 82; vertically-extending track to support vertical motion of the ride vehicle 84 along the ride path 82). The ride path 82 may be provided as an infrastructure on which the ride vehicle 84 may travel as users 14 are accommodated by the ride vehicle 84. The ride path 82 may thus define the motion of the ride vehicle 84. However, in another embodiment, for example, the ride path 82 may be replaced by a controlled path, in which the movement of the ride vehicle 84 may be controlled via an electronic system, a magnetic system, or other similar system infrastructure other than the ride path 82. In other words, the ride path of the ride vehicle 84 may not be physically constrained to an exact path, thereby allowing the users 14 some degree of control over their motion path, view perspective, and so forth. Other amusement park attractions may be positioned sufficiently proximate to the ride 80 to allow the users 14 a view of the attractions. By way of example, such attractions may include buildings 86 or similar structures.

It should be appreciated that while the ride vehicle 84 may be illustrated as a 4-passenger vehicle, in other embodiments, the ride vehicle 84 may include any number of passenger spaces (e.g., 1, 2, 4, 8, 10, or more spaces) to accommodate a single or multiple groups of passengers. It should also be appreciated that while the ride 80 may be illustrated having one ride vehicle 84, the ride 80 may include any number of ride vehicles 84 (e.g., 1, 2, 4, 8, 10, or more). As the ride vehicle 84 travels along the ride path 82, the users 14 may be provided a moving tour of the scenery (e.g., themed environment that may include fixed equipment, building layouts, props, decorations, and so forth corresponding to the theme). The scenery may include the environment surrounding the ride 80 and/or the environment within an infrastructure that may fully or partially house the ride 80.

While the users 14 may find the ride 80 to be a very enjoyable experience, in certain embodiments, it may be useful to enhance their ride experience. Specifically, the ride experience provided to the users 14 may be enhanced with gaming effects and other entertainment (e.g., multimedia entertainment) provided by the modular attraction system 50. In the illustrated embodiment, the modular attraction system 50 includes an on-board system 88 integrated with the ride vehicle 84 and an off-board system 90, which together are configured to provide augmented reality and/or virtual reality (AR/VR) experiences to the users 14 by way of head mounted displays (HMDs) 92 and/or other devices (e.g., other visual experience generators, speakers, haptic features). For example, as the ride vehicle 84 travels along the ride path 82, the modular attraction system 50, via the on-board system 88, may coordinate AR/VR images or features, such as AR/VR objects 94 (shown as a clown floating over the buildings 86), to be shown to the users 14 on their respective HMDs 92. The off-board system 90 may include various physical features such as displays, animatronics, and so forth. The operation of these devices may be coordinated with the visualizations presented on the HMDs 92.

Indeed, as set forth above, the modular attraction system 50 may coordinate the on-board system 88 and the off-board system 90 to collectively and collaboratively enhance the ride experience of the users 14. In certain embodiments, all or a portion of the off-board system 90 may be disposed along the ride path 82. For example, as the ride vehicle 84 travels along the ride path 82, the modular attraction system 50, via the off-board system 90, may coordinate visual and/or audible media provided by way of light systems, sound systems, animatronics, display systems, or any combination thereof, disposed along the ride path 82. The modular attraction system 50 may utilize the communication system 32, for example communication devices such as servers, routers, communication modules, antennas, and so forth, in the on-board system 88 and/or the off-board system 90 to facilitate provision of various show features to the users 14. The on-board system 88 and the off-board system 90 may communicate, for instance, over a network 96 to allow for coordination between on-board show events and off-board show events.

In the illustrated embodiment, for instance, the off-board system 90 includes an automated prop 98 that is controlled by features of the off-board system 90 in coordination with the on-board system 84. More specifically, as shown, the animated prop 98 is a cannon that shoots darts. The movement of the cannon, as well as air effects (e.g., air blasts), sound and/or light effects, and so forth provided by the cannon may be coordinated with rendering and display of the clown (AR object 94). For instance, by coordinating operation of the on-board system 88 and the off-board system 90, the cannon (automated prop 98) may seem to track the clown and the clown's balloons to seemingly shoot the balloons with darts to pop them and allow the clown to return to the ground.

As noted above, while the on-board system 88 is shown in FIG. 3 as being positioned on the ride vehicle 84, the components of the on-board system 88 may be placed in various locations relative to the ride vehicle 84 (e.g., placed along the ride path 82 to be co-located with the ride vehicle 84 during at least a portion of the ride). The modular attraction system 50 may also be used with other types of attractions, including attractions with stationary ride vehicles that do not travel along a ride path and/or attractions without ride vehicles.

In accordance with present embodiments, and as noted above, features of the on-board system 88, features of the off-board system 90, or any combination thereof, may be designed to readily allow maintenance and technical refreshes. For example, updated technologies may enable a more realistic simulation of the clown, darts, and so forth. FIGS. 4-7 depict example architectures to achieve refresh-ready designs.

Figure 4:
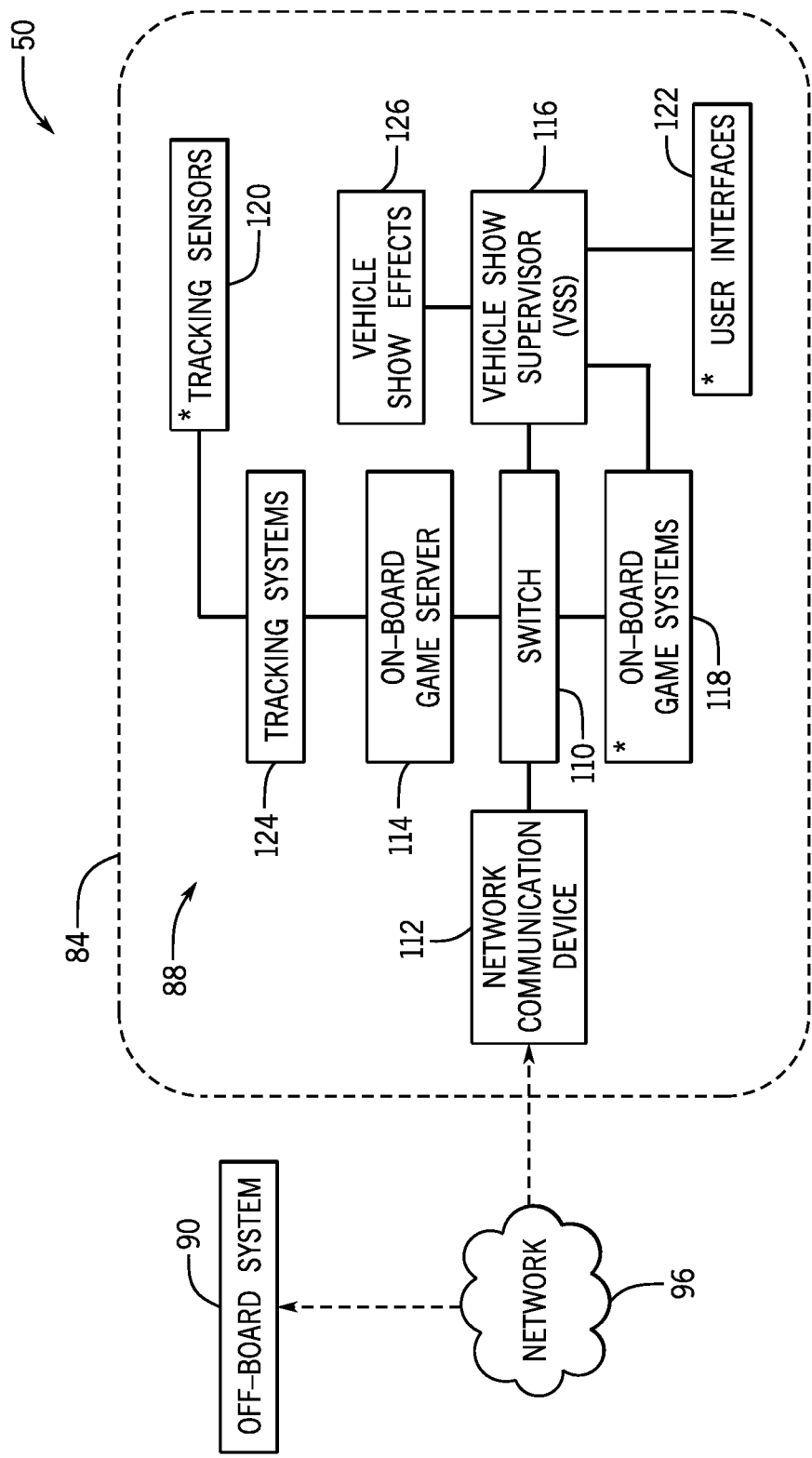
FIG. 4 is a block diagram of an embodiment of the on-board system that may be used with the ride vehicle of FIG. 3, in accordance with certain aspects of the present disclosure.

FIG. 4 is a block diagram of various components of the on-board system 88 of the modular attraction system 50. In the illustrated embodiment, the on-board system 88 is a dedicated system disposed on or integrated with the ride vehicle 84. It should be appreciated that the on-board system 88 may be integrated with the ride vehicle 84 such that all of the components of the on-board system 84 are physically located on the ride vehicle 84 (as shown in FIG. 4), or the on-board system 88 may be integrated with the ride vehicle 84 such that at least some components of the on-board system 88 are physically located on the ride vehicle 84 and at least some components of the on-board system 88 are physically located off of the ride vehicle 84 (e.g., physically separated from the ride vehicle 84). For example, the on-board game server 114 may be located off of the ride vehicle 84 and may communicate with the other components of the on-board system 88 via the network 96 to drive the on-board experience.

Additionally, as noted above, the attraction may not include a ride vehicle, but instead the user may walk or otherwise travel through the attraction wearing or carrying one or more interactive components, such as the one or more display features (e.g., the HMD), speakers, and/or haptics. In some such cases, all of the components of the on-board system 88 may be worn or carried by the user (e.g., move with the user), while all of the components of the off-board system 90 may be located off of the user (e.g., do not move with the user). However, the on-board system 88 may additionally or alternatively include components that are co-located with the user (e.g., components that are not worn or carried by the user, but are in proximity of the user during at least a portion of the amusement park attraction). In some such cases, at least some components of the on-board system may be positioned at a location along a path traversed by the user or otherwise proximate to the user, and these components of the on-board system 88 may communicate (e.g., via a wireless network) with other components of the on-board system 88 that are worn or carried by the user when the user is at or near the location along the path to drive the on-board experience. Furthermore, some components of the on-board system 88 may be located remotely from the user and/or the ride vehicle 84.

As shown in FIG. 4, the on-board system 88 may include a local network established using a central network switch 110 (e.g., an "on-board" network switch), which is configured to manage, or allow for management, of communications between various features of the on-board system 88. The switch 110 is configured to allow for communication between the on-board system 88 and the network 96 via a network communication device 112. In certain embodiments, the switch 110 and the network communication device 112 may be integrated together in a single device (e.g., communication device). As an example, the switch 110 may be a router or similar device and the network communication device 112 may be a modem or similar device. It should be appreciated that the on-board system 88 may include any suitable communication component(s) that enable communication between the on-board system 88 and the network 96.

In accordance with present embodiments, the network communication device 112 and the switch 110 may be separate, but may utilize standardized communication protocols and connectors to facilitate connection with a wide variety of devices. In the illustrated embodiment, for example, the switch 110 has an internal network connection (internal to the on-board system 88) with the on-board game server 114, the VSS 116, and one or more on-board game systems 118, for example by way of one or more communications buses, cabling, or wireless devices. These features are described in further detail below.

The on-board game server 114, the vehicle show supervisor (VSS) 116, and the one or more on-board game systems 118, as illustrated, are connected to various devices on board the ride vehicle 84 and/or to one another. These connections are intended to indicate one or more communications connections, power connections, and so forth. Further, it should be noted that while only one block is used for certain components, such components may be present as multiple devices and are designated with an asterisk. For example, while the on-board game systems 118 is shown as a single box, this single box may, in certain embodiments, represent a series of features (a plurality of on-board game systems) that are redundantly in place for each of the positions corresponding to one of the users 14 (e.g., each seat of the ride vehicle 84). Again, in the context of the ride vehicle 84, it should be noted that the user 14 is intended, in some embodiments, to denote a passenger of the ride vehicle 84. Other illustrated features that may be redundantly present include tracking sensors 120 and user interfaces 122.

One or more tracking systems 124 are illustrated as connected to the one or more tracking sensors 120. The tracking system 124 may include a special-purpose computing device disposed on or integrated with the ride vehicle 84 to process data generated by the tracking sensors 120 indicative of the positions, locations, orientations, presences, and so forth of the HMDs 92, the users 14, the ride vehicle 84, or any combination of these. The tracking system 124 may be configured to interface with a variety of tracking devices, and is programmed to receive data from the tracking sensors 120 and to process this data to provide tracking information to the on-board game server 114. Indeed, the tracking system 124 may have a direct network connection to the on-board game server 114 to minimize latency between the reception of tracking data and concomitant responses by the various features of the on-board system 88 and/or off-board system 90. Further, this direct connection may facilitate technical refreshes and maintenance since the manner in which the tracking data may be used by the on-board system 88 is not necessarily dependent on any of the other devices present in the system.

The tracking sensors 120 may include orientation and position sensors (e.g., accelerometers, magnetometers, gyroscopes, Global Positioning System [GPS] receivers), motion tracking sensors (e.g., electromagnetic and solid-state motion tracking sensors), inertial measurement units (IMU), presence sensors, and others. In some embodiments, the tracking sensors 120 may be disposed on or integrated with the HMDs 92 and thus are configured to generate data representative of the motion and orientation of the HMDs. Indeed, the data received by tracking system 124 may be useful in determining each user's gaze direction, viewing perspective, field of view, viewing interest, interaction with the game, and so forth. Additionally or alternatively, the tracking system 124 may also use data generated by the tracking sensors 120 to track operational information of the ride vehicle 84, including but not limited to, a position, orientation, velocity, motion vector, or other parameter of the ride vehicle 84.

As set forth previously, the user interfaces 122 may be present for each of the users 14 to allow each user 14 some level of control over their experience. In certain embodiments, the one or more user interfaces 122 may be disposed on or integrated with each seat or passenger space of the ride vehicle 84. The one or more user interfaces 122 may include analog and digital devices, such as handheld controllers, joysticks, push buttons, steering wheels, and so forth. For example, the one or more user interfaces 122 may be configured to enable different actions and/or effects to be applied in the AR/VR environment established on the HMDs 92 using other features of the on-board game systems 118. For example, the one or more user interfaces 122 may allow the user 14 to affect a character or an object of the AR/VR features in different directions (e.g., up, down, left, right) in the AR/VR environment. By way of more specific but non-limiting example, the one or more user interfaces 122 may allow the passenger to make selections or grab/release objects of the AR/VR features in the AR/VR environment. In some embodiments, the one or more user interfaces 122 may allow the user 14 to control operation of the ride vehicle 84, such as changing its velocity and/or direction. In some embodiments, the one or more user interfaces 122 may also include one or more display screens and/or touch screens to allow information to be communicated to the user 14.

The user interfaces 122 may be directly coupled to the VSS 116, which may be a programmable logic controller (PLC), or other suitable control device. For instance, the VSS 116 may include a processor (e.g., a general-purpose processor, a system-on-chip (SoC) device, an application-specific integrated circuit (ASIC), or some other similar processor configuration) operatively coupled to a memory (e.g., a tangible non-transitory computer-readable medium and/or other storage device) to execute instructions stored in the memory. The VSS 116 may be considered to be one of the controllers 28 shown in FIG. 1.

The VSS 116, generally, may be configured to coordinate various operations of the on-board system 88 in response to user inputs and in response to instructions provided by the on-board game systems 118 and the off-board system 90, for example due to execution of game logic. In the illustrated embodiment, the VSS 116 is communicatively coupled to the one or more on-board game systems 118 and the one or more user interfaces 122, such that information may be provided to and from the one or more user interfaces 122 and the one or more on-board game systems 118. The VSS 116 may also provide power to the one or more user interfaces 122 and the one or more on-board game systems 118, as appropriate.

By way of non-limiting example, the VSS 116 may have a number of voltage connections to the on-board game systems 118 for power-on commands, reset commands, and for power indications from the on-board game systems 118. For instance, during operation the VSS 116 may send signals to reset and/or to change on/off states of the one or more on-board game systems 118. Similar connections may also be present between the VSS 116 and the user interfaces 122. In embodiments where the one or more user interfaces 122 include one or more display screens and/or touch screens, the VSS 116 may control a power state of the device, timing of the device, certain content (e.g., displayed content), and so forth. Other vehicle show effect devices 126 may also be connected to, powered, and controlled by the VSS 116. By way of example, such devices 126 may include vehicle lights, automated devices of the ride vehicle 84, effect devices of the ride vehicle 84 (e.g., air cannons, water cannons), and so forth.

As illustrated and noted above, the VSS 116 has one or more direct connections to the on-board game systems 118 to allow for power cycling, power state control, and so forth. However, the VSS 116 may also control other devices responsible for motion of the ride vehicle 84. For example, the VSS 116 may control steering features (e.g., axles, wheels) in response to inputs from the user interfaces 122, and in response to data received from the on-board game server 114 relating to other ride vehicles 84, off-board show elements, and so forth.

Indeed, in a given ride attraction, there may be multiple ride vehicles 84, each having a corresponding set of devices. To facilitate coordination between these devices and because the inputs from multiple users 14 may be used to update each user's experience, inputs from the user interfaces 122, rather than simply being provided directly to the on-board game system 118 corresponding to an individual user, may instead be provided to the network 96 via the local network connection between the VSS 116 and the switch 110. Provision of such inputs, as noted above, may be controlled by the on-board game server 114. In such embodiments, each user's inputs are coordinated and communicated over the local network of the ride vehicle 84 and the network 96, which allows rapid communication with low latency because the inputs are not processed (or are minimally processed) before they are received by the individual on-board game systems 118 and the VSS 116. It should be appreciated that some or all of capabilities of the VSS 116 disclosed herein may be included in another processing component (e.g., processing or computing system) of the on-board system 88, such as in the on-board game server 114.

As there are multiple on-board game systems 118, each controlled in accordance with inputs from multiple user input devices 122, the architecture shown in FIG. 4 allows for ready replacement, maintenance, and updates to be performed on them individually without requiring corresponding activities to be performed on other input devices 122 or other on-board game systems 118. Further, this type of connection and communication scheme may also reduce latency in graphical rendering activity performed by the on-board game systems 118, for example in response to user inputs.

To allow for the coordinated and controlled data communication set forth above, the on-board game server 114 may include a special-purpose computing device (e.g., a specially-programmed computing device) that is programmed to coordinate how information is transmitted and received on the network 96 with respect to the ride vehicle 84. That is, the on-board game server 114 may coordinate network data traffic for the ride vehicle 84, including data that is transmitted over the network 96 to and from the off-board system 90 and to other ride vehicles 84. This may be done, for example, to ensure that certain types of data are prioritized over others according to an information hierarchy (e.g., a communication hierarchy). The on-board game server 114 may include one or more programmable logic controllers (PLCs), or other suitable control devices. Additionally or alternatively, the on-board game server 114 may include a processor (e.g., a general-purpose processor, a system-on-chip (SoC) device, an application-specific integrated circuit (ASIC), or some other similar processor configuration) operatively coupled to a memory (e.g., a tangible non-transitory computer-readable medium and/or other storage device) to execute instructions stored in the memory. In certain embodiments, the on-board game server 114 is a server computer which may also include standardized communications ports to allow for ready integration of new, replacement, or repaired devices, and may be programmed to communicate in accordance with appropriate standards (e.g., proprietary standards, IEEE standards).

As noted, the on-board game server 114, generally, may be configured to coordinate communication of various information between the on-board system 88 and the off-board system 90, and also between the various components of the on-board system 88. In particular, the various information may be routed via the switch 110. As also previously noted, the switch 110 is generally a router or any suitable networking device that forwards information (e.g., data packets) to destination nodes (e.g., the various devices of the on-board system 88) or computer networks, so as to perform the traffic directing functions on the network (e.g., the communication network 96 and the local network of the ride vehicle 84). As an example, the on-board game server 114 may direct information between the one or more tracking systems 124, the one or more on-board game systems 118, and the VSS 116, via the switch 110.

In addition, the on-board game server 114 may be configured to coordinate or synchronize communication of information depending on the information type (e.g., information priority). By way of example, the on-board game server 114 may determine or have stored relative priorities of the different types of information and communicate such information based on their relative priorities. In an example information hierarchy, information related to operations of the ride 80 may be a first type, information related to generation of the game and entertainment experiences may be a second type, and so forth. By way of more specific example, information that may ensure or affect operations and/or safety of the ride 80 may have the highest priority, information that conveys game-related notifications or game-related information may have the second highest priority, and so forth.

In some embodiments, the on-board game server 114 may communicate information determined as having the highest priority before communicating other information determined as having a lower priority. In a practical sense, for example, if one ride vehicle 84 is identified as being stopped, this information would be communicated to other ride vehicles 84 (e.g., to allow for emergency stops of the remaining ride vehicles 84) before other information (e.g., game information) is transmitted.

In some embodiments, the on-board game server 114 may communicate information based on their types and relative priorities and other factors, such as the available bandwidth of the network 96, timing of the game and entertainment experiences, size of the data packet, etc. As such, the on-board game server 114 may coordinate or synchronize the communication of various information effectively and ensure communication of important information.

The one or more on-board game systems 118, generally, may be configured to provide game experiences (e.g., AR/VR experiences) to the users 14 via the HMDs 92 and/or other devices (e.g., other visual experience generators, speakers, haptic features). In particular, each seat or passenger space of the ride vehicle 84 may include a dedicated on-board game system 118, and the plurality of on-board game systems 118 allow for the passengers to participate in a shared game (e.g., a multiplayer game). The one or more on-board game systems 118 will be discussed in more detail in FIG. 5, which is a schematic diagram of an embodiment of the one or more on-board game systems 118 of the ride vehicle 84 (or multiple ride vehicles 84).

Figure 5:
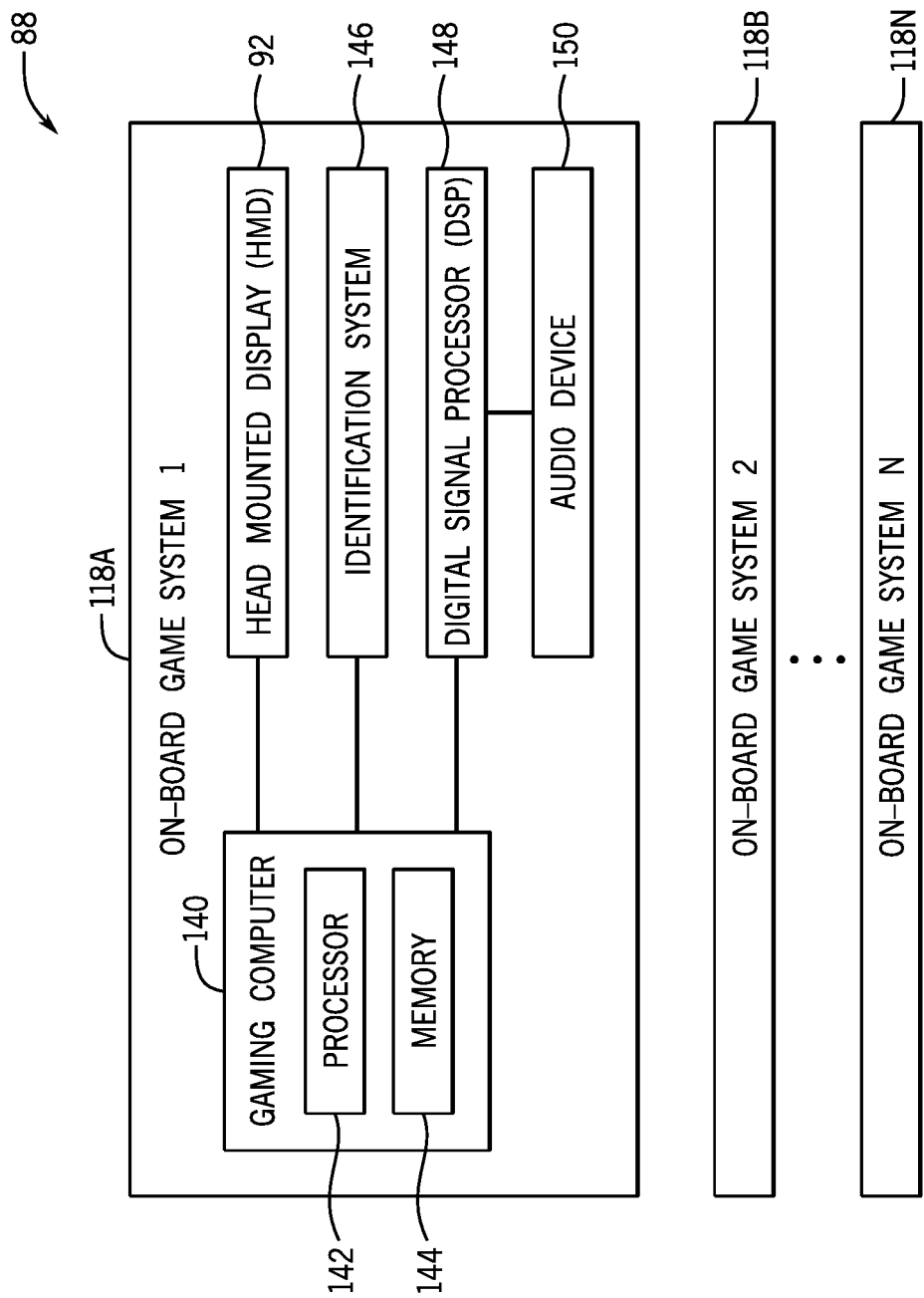
FIG. 5 is a block diagram of an embodiment of on-board game systems of the on-board system of FIG. 4, in accordance with certain aspects of the present disclosure.

As illustrated in FIG. 5, the one or more on-board game systems 118 may include various features that, as a whole, are configured to provide a gaming experience that is enhanced with AR/VR graphics to one of the users 14. More specifically, FIG. 5 illustrates a plurality of the on-board game systems 118, including a first on-board game system 118A, a second on-board game system 118B, and so on . . . to an $n^{th}$ on-board game system 118N (e.g., depending on the number of available seats and corresponding on-board game systems provided by the ride vehicle 84). Specific components are described herein with respect to the first on-board game system 118A, but it should be appreciated that similar or the same components may be present in all the on-board game systems 118. Further, the components described herein may be integrated into the on-board game systems 118 in a manner that is consistent with the approach described with respect to FIG. 2. It should be appreciated that an on-board game system 118 may not be provided for each seat of the ride vehicle 84. For example, an on-board game system 118 may instead be provided for a group of seats (e.g., a team of users) or for the ride vehicle 84 as a whole, and the AR/VR experience may be provided via multiple HMDs 92 and/or other types of visual experience generator(s). As another example, the on-board system 88 may be used in an attraction without the ride vehicle 84, and in such cases, the on-board game systems 118 may be provided for each user or for a group of users.

The first on-board game system 118A includes a gaming computer 140 programmed with appropriate game logic, and may incorporate appropriate rendering hardware and software that is capable of being integrated into the on-board game system 118 in a manner that allows rapid maintenance, replacement, and technical refreshes as set forth in FIG. 2. For example, the gaming computer 140 may include processing circuitry 142 and memory circuitry 144 specially programmed to perform functions associated with graphical rendering and overlay. For example, the gaming computer 140 may include one or more graphics cards.

By way of example, the processing circuitry 142 and the memory circuitry 144 may include game logic, and may run simulations of the real-world ride vehicle 84 based on, for example, a stored map of the real-world environment, motion profile information, and stage geometry for the placement of virtual objects in real space via the HMDs 92. Each gaming computer 140 may perform these functions for each on-board game system 118, or certain functions may be shared across the different gaming computers 140 of the on-board game systems 118. For example, the gaming computer 140 of the first on-board game system 118A may render content and perform simulations corresponding to actions of a first user, and the gaming computer 140 of the second on-board game system 118B may render content and perform simulations corresponding to actions of a second user. These renderings and simulations may, in certain embodiments, be communicated across on-board game systems 118 to reduce computing time. However, in certain embodiments and as set forth above, the on-board game server 114 may communicate non-processed or minimally proceed data to all the on-board game systems 118 to reduce input latency. Further, in certain embodiments, the gaming computers 140 may have more sophisticated programming and communication to allow for information sharing, such as direct memory access capabilities.

The gaming computer 140 is communicatively coupled by way of communication and power conductors (e.g., hardwired) to the HMD 92. For example, the HMD 92 may essentially be considered the display corresponding to the gaming computer 140. Because the gaming computer 140 is able to provide power and communication to the HMD 92, the HMD 92 does not necessarily require a local power source or local processing circuitry for rendering content. The connections between the gaming computer 140 and the HMD 92 may be made in accordance with any appropriate communications and power standards. For example, the gaming computer 140 may power and/or provide video to the HMD 92 using any appropriate universal serial bus (USB) standard, any appropriate high-definition multimedia interface (HDMI) standard, or other communication, power, and/or connection standard, or any combination thereof. In certain embodiments, the HMD 92 may be tethered to the ride vehicle 84, and there may be one or more intermediate interfaces between the HMD 92 and the gaming computer 140 located on and/or within the ride vehicle 84. Such a configuration may be desirable, for example, to allow maintenance to be performed on the HMD 92 (e.g., cleaning between uses by different users 14) with minimal to no downtime for the ride vehicle 84.

The HMD 92, generally, may be configured to display the AR/VR environment rendered by the gaming computer 140. In particular, the HMD 92 may include electronic eyeglasses that may include one or more displays configured to allow projection and/or overlay of AR/VR features. The HMD 92 may also include orientation and/or position sensors, such as accelerometer, magnetometer, gyroscopes, GPS receiver, motion tracking sensor, electromagnetic and solid-state motion tracking sensor, IMU, presence sensor, and others. Indeed, in certain embodiments, the HMD 92 may incorporate the tracking sensors 120 set forth in FIG. 4. In accordance with present embodiments, the HMD 92 may receive display signals so that the AR/VR graphics can be shown on the one or more displays.

The gaming computer 140 may also render content in accordance with identifying information associated with the user 14. For example, the gaming computer 140 as illustrated is communicatively coupled to an identification system 146. The identification system 146 is generally configured to read identifying information about the user 14 from a device that is associated with the user 14 (e.g., a personal electronic device, wearable, or the like). For example, the identification system 146 may include radio-frequency identification (RFID), near-field communication (NFC), or any other suitable identification technology to determine the identification of the respective user 14. For example, the identification system 146 may include an RFID reader to read an RFID tag carried by the respective user 14 to determine some aspect relating to the user 14, for example a team association of the user 14 (e.g., team "barn animal" versus team "clown"). In some embodiments, the information detected by the identification system 146 may be used by the gaming computer 140 to generate a personalized game experience by rendering content that is associated with the user's information. For example, if the user 14 is on team clown, content may be rendered in accordance with a clown theme (e.g., with balloons, cotton candy).

To provide a more immersive experience, the ride vehicle 84 may also include audio outputs. In the illustrated embodiment, the first on-board game system 118A includes a digital signal processor (DSP) 148 and one or more audio devices 150. The audio may be provided in a dedicated manner for each of the users 14, for example as headphones specific to each user 14, speakers proximate the head area for each user 14, and so forth. Additionally or alternatively, the audio may be provided for the entire ride vehicle 84, but with dedicated signals being provided to each speaker of the ride vehicle 84 to provide for surround sound effects, and so forth. In this respect, the DSP 148 may include corresponding processing circuitry configured to perform digital signal processing to generate audio effects based on instructions from the gaming computer 140, and to output audio signals to the one or more audio devices 150. It should be noted that in embodiments where the audio outputs are shared for the entire ride vehicle 84, there may be only one DSP 148 per ride vehicle 84, and accordingly all the gaming computers 140 on that ride vehicle 84 may provide inputs to the same digital signal processor 148.

In practice of certain embodiments, the gaming computer 140 may receive inputs from a variety of sources, but are generally communicated from the switch 110 and the on-board game server 114 (see, e.g., FIG. 4), unless the inputs are from the identification system 146 or are power signals. Based on the inputs, the gaming computer 140 may process and render graphics to be displayed using the HMD 92. The gaming computer 140 may also provide audio information to the DSP 148 in concert with rendering of the graphics, to allow the DSP 148 to generate audio signals for the one or more audio devices 150. The inputs may include information communicated via the on-board game server 114, such as information useful in generating AR/VR experience for the respective user 14. The inputs may include, but are not limited to, information related to or indicative of the user's position, orientation, focal length, gaze direction, field of view, motion, or any combination thereof. The inputs may, additionally or alternatively, include, but are not limited to, information related to or indicative of the ride vehicle's position, orientation, motion vector, velocity, or any combination thereof.

The inputs may additionally or alternatively include, but are not limited to, information related to or indicative of the passenger's user information (e.g., any suitable information provided by or authorized by the user/passenger, such as payment information, membership information), personal information (e.g., age, height, special needs, etc.), gaming information (e.g., information about the AR/VR game associated with themed attractions, information about a particular character the user/passenger is associated with in the AR/VR game, information about game history of the user), or any combination thereof. As may be appreciated, the information detected by the identification system 146 may allow the gaming computer 140 to link or associate the respective user 14 to a particular portion of the inputs corresponding to data indicative of the user information, personal information, gaming information, or any combination thereof.

Further still, the inputs may include, but are not limited to, information related to or indicative of the user's engagement or interaction with the AR/VR features, such as operation of handheld controllers, joysticks, push buttons, or any combination thereof of the one or more user interfaces 122. As such, the gaming computer 140 may generate AR/VR features corresponding to actions applied by the user 14 (e.g., actions in the AR/VR environment, such as shooting a stream of water, grabbing an AR or VR object). The inputs may include, but are not limited to, information related to or indicative of the user's engagement in a shared game (e.g., a game having multiple players). As such, the gaming computers 140 of the on-board game systems 118 engaged in the shared game may coordinate generation and rendering of the AR/VR features, such that the users 14 engaged in the same game may see the same AR/VR features on their HMDs 92.

Figure 6:
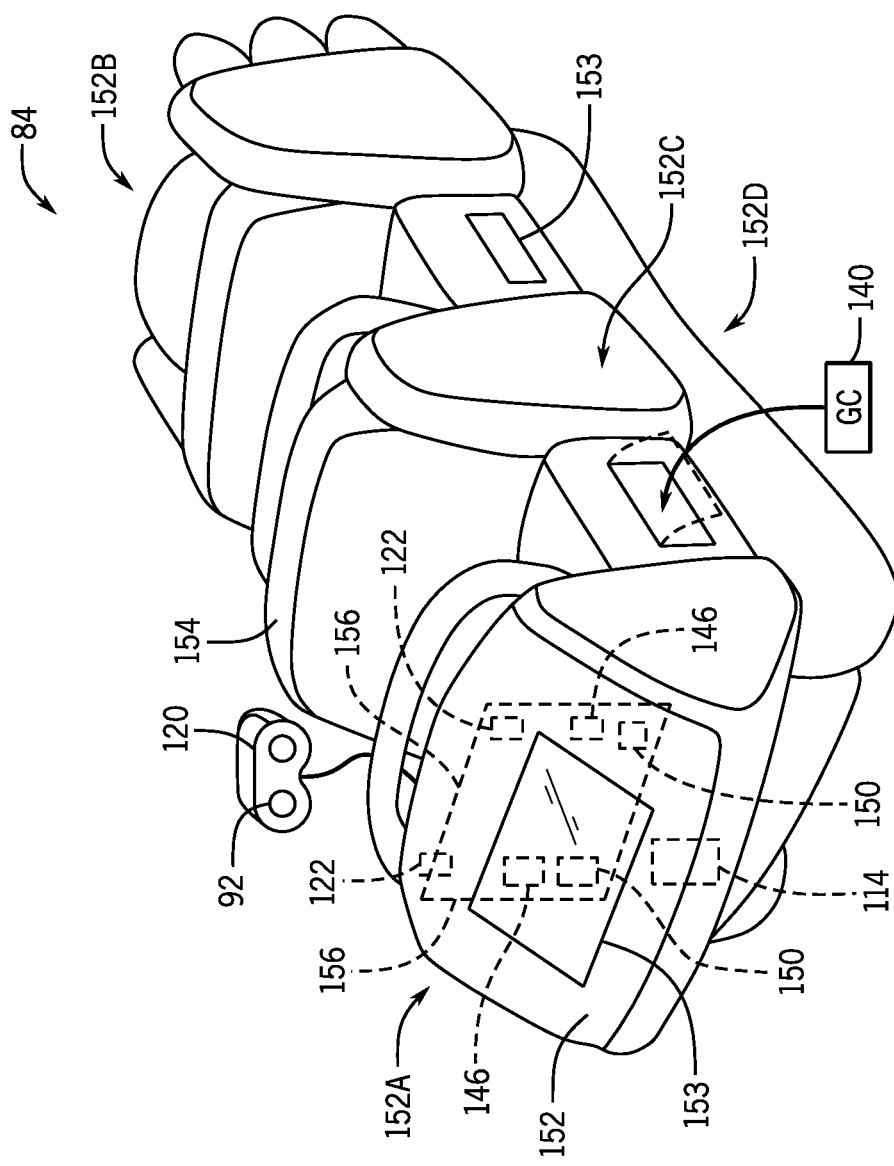
FIG. 6 is a perspective view of an embodiment of the ride vehicle of FIG. 3, in accordance with certain aspects of the present disclosure.

FIG. 6 is a perspective view of an embodiment of the ride vehicle 84, illustrating an example of various components of the on-board system 88 integrated with the ride vehicle 84. As noted above, in some embodiments, certain components of the on-board system 88 may be located off of the ride vehicle 84. In the illustrated embodiment, the ride vehicle 84 may have a body 152 or a frame including a front portion 152A, a back portion 152B, a side portion 152C, and a bottom portion 152D, all or some of which may be fitted with access panels 153. For example, the access panels 153 may be formed into a surface of the body 152. In accordance with present embodiments, the access panels 153 may be used to readily access mechanical features of the ride vehicle 84 and/or features of the on-board system 88.

One or more seats or passenger spaces 154 (e.g., four seats) of the ride vehicle 84 are configured to accommodate one or more passengers (users 14). The ride vehicle 84 may include one or more front panels 156 in front of the one or more seats 154 to allow the users 14 to access various features, such as the user interfaces 122, HMDs 92, and so forth. Indeed, at least some of the various components of the on-board system 88 may be integrated with and/or disposed on the ride vehicle 84 in an arrangement as discussed below. However, it should be noted that such an arrangement is provided as an example, and in other embodiments, the arrangement may vary depending at least on the configuration of the ride vehicle 84.

In the illustrated example, the on-board game server 114 may be in the front portion 152A of the body 152. The on-board game systems 118, or certain of their respective features, may be in usable proximity of their respective seats 154. As one particular example, the HMD 92 of the on-board game system 118 may be tethered via a cable or a wire to the front panel 156. The identification systems 146 and the audio devices 150 of the on-board game systems 118 may also be disposed on or integrated with the front panels 156.

Each of the gaming computers 140 may be disposed, for example, in a space or compartment in or below a respective one of the seats 154. The user interfaces 122 may be integrated with the respective front panel 156 and/or adjacent to the respective seat 154. As set forth above, each seat 154 has a dedicated HMD 92, identification system 146, audio device 150, gaming computer 140, and user interface 122. The tracking systems 124 may be disposed on or integrated with the ride vehicle 84 at locations suited for the functionality. For example, some of the sensors 120 (e.g., accelerometer, GPS receiver, presence sensor, motion tracking sensor) of the tracking system 124 may be disposed in the front portion 152A of the body 152, and some of the sensors 120 (e.g., IMU, gyroscope) may be disposed on or integrated with the HMD 92. It should be noted that, generally, the various components of the on-board system 88 are integrated with the ride vehicle 84 in a manner such that the various components are readily accessible via the access panels 153 for replacement, modification, maintenance, upgrade, and so forth.

As set forth above, the on-board system 88 of the ride vehicle 84 communicates via the network 96 with the off-board system 90. The off-board system 90, as set forth above, may include a variety of devices that are generally designed to complement the AR and/or VR graphics generated by the on-board game systems 118.

Figure 7:
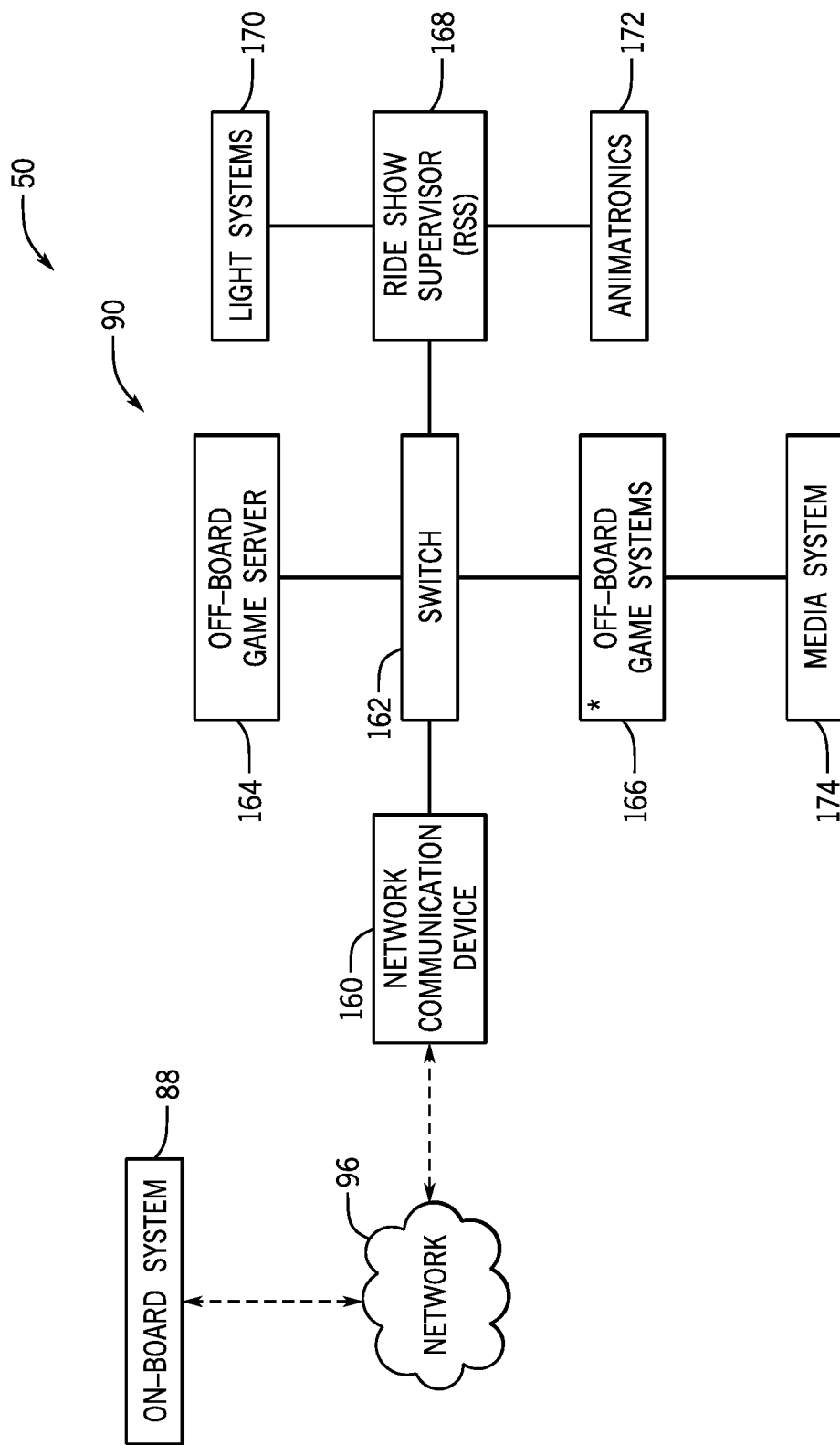
FIG. 7 is a block diagram of an embodiment of the off-board system of the modular attraction system of FIG. 3, in accordance with certain aspects of the present disclosure.

FIG. 7 is a block diagram of an embodiment of the off-board system 90 of the modular attraction system 50. In the illustrated embodiment, the off-board system 90 may be disposed in proximity to or along the ride path 82. The off-board system 90 may include certain features that perform similar roles to those described with respect to the on-board system 88. For example, the off-board system 90 may include a network communication device 160 (e.g., a modem) and switch 162 (e.g., a router) that establish a connection with the network 96 and establish a local network between the off-board system components. It should be appreciated that the off-board system 90 may include any suitable communication component(s) that enable communication between the off-board system 90 and the network 96. The connection between the various components of the off-board system 90 may include a wired and/or wireless communication network, such as WLAN, WWAN, and NFC.

As shown, the switch 162 is directly connected to an off-board game server 164, one or more off-board game systems 166, and a ride show supervisor (RSS) 168. There may be only one, or a plurality of different off-board game systems 166, as denoted by an asterisk.

The RSS 168 may be a programmable logic controller (PLC), or other suitable control device. The RSS 168 may include a processor (e.g., a general-purpose processor, a system-on-chip (SoC) device, an application-specific integrated circuit (ASIC), or some other similar processor configuration) operatively coupled to a memory (e.g., a tangible non-transitory computer-readable medium and/or other storage device) to execute instructions stored in the memory. The RSS 168, generally, may be configured to coordinate the off-board entertainment experiences using one or more light systems 170, one or more animatronics 172, or other props. In particular, the RSS 168 may be communicatively coupled to the one or more light systems 170 and the one or more animatronics 172 to control or regulate their operations. For example, the RSS 168 may control intensity, incident angle, on/off states, color, and other effects of the one or more light systems 170. The RSS 168 may control movements, on/off states, and other actions (e.g., sound effects, light effects) of the one or more animatronics 172 or other props. In some embodiments, the RSS 168 may control or regulate the operations of the one or more light systems 170 and the one or more animatronics 172 based on the AR/VR experiences rendered by the on-board system 88, or in coordination with other elements of the off-board system 90.

The one or more light systems 170 may include various lights, such as ceiling lights, lamps, wall lights, exterior lights, and so forth. The one or more animatronics 172 may include various robotic devices that emulate certain lifelike movements. Further, while not specifically shown, other props such as automated show effects, may be controlled by the RSS 168 in response to signals received via the switch 162, for example in coordination with operations of the on-board system 88.

The one or more off-board game systems 166 may have a similar configuration to the on-board game system 118 described with respect to FIG. 4. For example, the one or more off-board game systems 166 may each include a processor (e.g., a general-purpose processor, a system-on-chip (SoC) device, an application-specific integrated circuit (ASIC), or some other similar processor configuration) operatively coupled to a memory (e.g., a tangible non-transitory computer-readable medium and/or other storage device) to execute instructions. The one or more off-board game systems 166, generally, may be configured to provide and coordinate entertainment experiences to the passengers, using the one or more media systems 174. In particular, the one or more off-board game systems 166 may transmit audio/video data (e.g., via a high-definition multimedia interface (HDMI)) to the media system 174, and the media system 174 may present the audio/video data via one or more display devices (e.g., projection display devices, digital display devices) and one or more sound devices (e.g., speakers) disposed along the ride path 82. The one or more off-board game systems 166 may coordinate transmission of the audio/video data and/or control operations of the one or more media systems 174, such that the audio/video contents are displayed on different media systems 174 in a coordinated/synchronized timing or schedule.

The off-board game server 164 may be a specially-programmed server computer, a programmable logic controller (PLC), or other suitable control device. The off-board game server 164 may include a processor (e.g., a general-purpose processor, a system-on-chip (SoC) device, an application-specific integrated circuit (ASIC), or some other similar processor configuration) operatively coupled to a memory (e.g., a tangible non-transitory computer-readable medium and/or other storage device) to execute instructions stored in the memory. The off-board game server 164, generally, may be configured to coordinate communication of various information between the various components of the off-board system 90, and also between the on-board system 88 and the off-board system 90 over the network 96.

In particular, the various information may be routed to the various components of the off-board system 90 via the switch 162. The switch 162 is generally a router or any suitable networking device that forwards information (e.g., data packets) to destination nodes or computer networks, so as to perform the traffic directing functions on the network. As an example, the off board game server 164 may direct information between the RSS 168 and the one or more off-board game systems 166, via the switch 162.

In addition, the off-board game server 164 may be configured to coordinate or synchronize communication of information depending on the information types and/or priorities, in a similar manner as the on-board game server 114. As such, the off-board game server 164 may coordinate or synchronize the communication effectively and ensure communication of important information.

Figure 8:
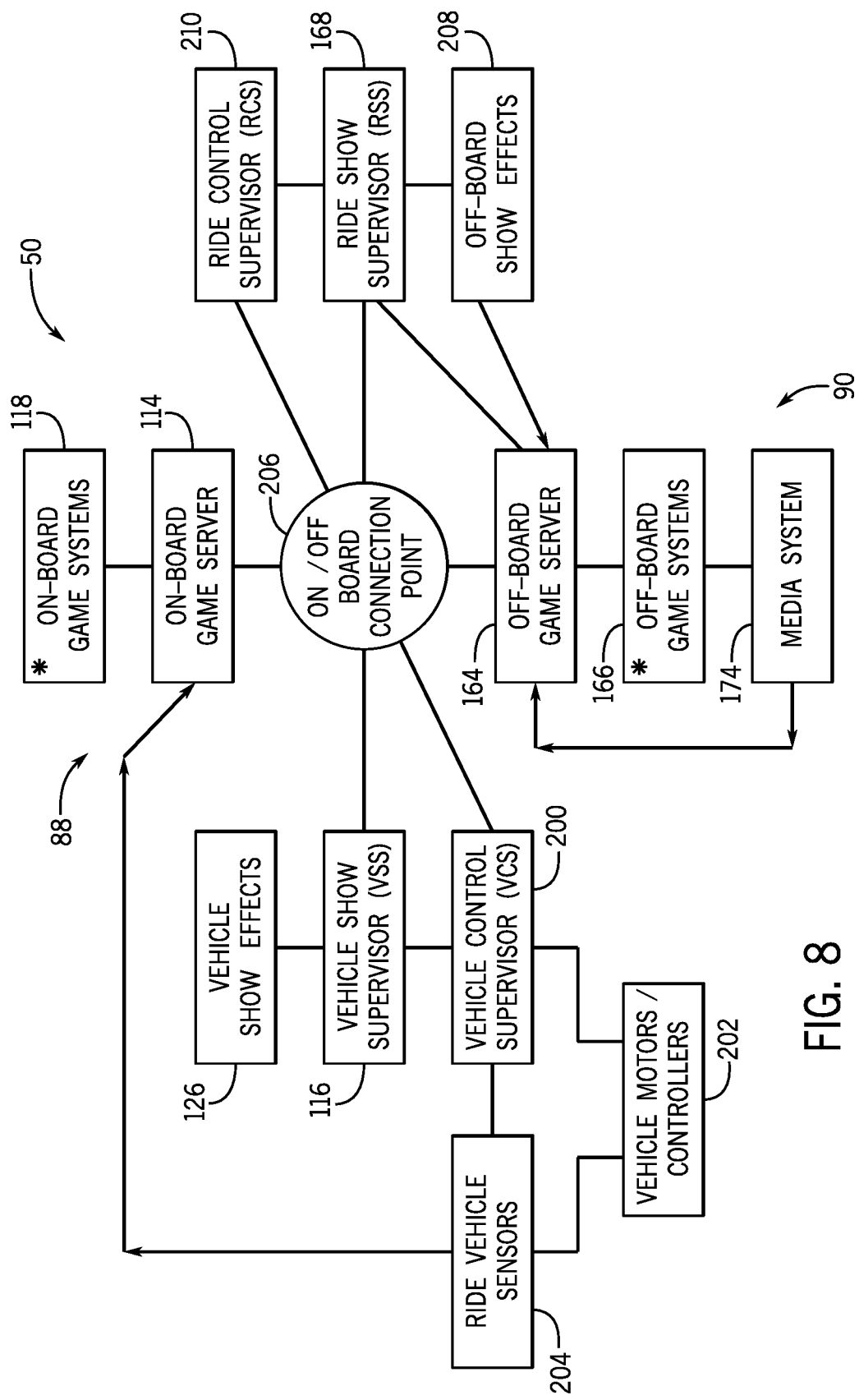
FIG. 8 is a block diagram of an embodiment of the on-board system and the off-board system that may be used in the modular attraction system of FIG. 3, in accordance with certain aspects of the present disclosure.

FIG. 8 is a block diagram of an embodiment of the on-board system 88 and the off-board system 90 that may be used in the modular attraction system 50. As shown, the on-board system 88 includes the on-board game server 114 and the on-board game systems 118. The on-board system 88 also includes the VSS 116 and the vehicle show effects 126, as well as a vehicle control supervisor (VCS) 200, vehicle controllers/motors 202 (e.g., steering controllers; motors), and vehicle sensors 204. The vehicle sensors 204 may be an example of the tracking sensors 120 described with respect to FIG. 4. The on-board system 88 may include other features, such as other types of tracking sensors 120 and the tracking systems 124, and/or the user interfaces 122 of FIG. 4, for example.

The VCS 200 may be a programmable logic controller (PLC), or other suitable control device. For instance, the VCS 200 may include a processor (e.g., a general-purpose processor, a system-on-chip (SoC) device, an application-specific integrated circuit (ASIC), or some other similar processor configuration) operatively coupled to a memory (e.g., a tangible non-transitory computer-readable medium and/or other storage device) to execute instructions stored in the memory. The VCS 200 may be configured to coordinate various operations and movements of the ride vehicle 84 in response to information and/or instructions provided by other components of the on-board system 88 and by the off-board system 90. In particular, the VCS 200 may receive signals from the vehicle sensors 204 (e.g., indicative of a position, orientation, velocity, motion vector, or other parameter of the ride vehicle 84), game information from the on-board server 114 (e.g., via a connection point 206), and/or other information related to other ride vehicles 84, off-board show effects 208 (e.g., the light systems 170, the animatronics 172). The VCS 200 may then send signals to instruct the vehicle controllers/motors 202 to control the movement of the ride vehicle 84 (e.g., forward and/or rearward movement along the track) based on the received signals and information. In the illustrated embodiments, the VCS 200 is also communicatively coupled to the VSS 116, such that information may be exchanged between the VSS 116 and the VCS 200. In this way, the VCS 200 and the VSS 116 may coordinate the vehicle show effects 126 and the movement of the ride vehicle 84, for example. As shown, signals from the vehicle sensors 204 may also be provided to the on-board game server 114, which may enable the on-board game server 114 to coordinate the movement of the ride vehicle 84 with other effects or events, such as the game played via the on-board game system 118.

In the illustrated embodiment, the off-board system 90 includes the off-board game server 164, the off-board game systems 166, and the media system 174. The off-board system 90 also includes the RSS 168, off-board show effects 208, and a ride control supervisor (RCS) 210. The RCS 210 may be a programmable logic controller (PLC), or other suitable control device. The RCS 210 may include a processor (e.g., a general-purpose processor, a system-on-chip (SoC) device, an application-specific integrated circuit (ASIC), or some other similar processor configuration) operatively coupled to a memory (e.g., a tangible non-transitory computer-readable medium and/or other storage device) to execute instructions stored in the memory. The RCS 210 may be configured to coordinate various operations and movements of multiple different ride vehicles within the attraction (e.g., along the ride path 82) in response to information and/or instructions provided by components of the on-board system 88 and/or by other components of the off-board system 90, for example.

Various components of the on-board system 88 and the off-board system 90 may be connected to one another as shown by a connection point 206, which represents various communication connections, power connections, and so forth. For example, some of the communication connections may be achieved via the switch 110, the network communication device 112, the switch 162, and/or the network communication device 160 described herein with respect to FIGS. 4 and 7. The connection point 206 may generally include a network and related features that enable any of a variety of components of the modular attraction system 50 to communicate with one another (e.g., the RSS 168 and the VSS 116 may communicate via the connection point 206). While certain connections in FIG. 8 (and other figures) are illustrated (e.g., via connecting lines that may indicate two-way communication and arrows that may indicate one-way communication) between various components of the modular attraction system 50, it should be appreciated that the components shown and described herein may be connected in any of a variety of ways (e.g., some illustrated connections may be removed and/or some other connections may be added; one-way connections may be two-way connections, and vice versa). Furthermore, while certain components in FIG. 8 (and other figures) are illustrated, it should be appreciated that the some of the illustrated components may be removed and/or some other components may be added. Processing functions discussed herein may also be divided or distributed among the components in various other ways (e.g., some functions of the VSS 116 may be carried out by the on-board game server 114).

It should be noted that the modular attraction system 50 includes the on-board system 88 and the off-board system 90, and each may have its own individually distinct functionality. When these functionalities are combined, they may be used to provide gaming effects and other entertainment to provide an overall experience and to enhance the ride experience. Furthermore, within each of the on-board system 88 and the off-board system 90, modularity is built in, such that each of the various portions/components of the on-board system 88 and of the off-board system 90 has its individually distinct functionality. While all of these functionalities are controlled and regulated by the modular attraction system 50 in a cooperative and collaborative manner, the individual distinct functionality may be flexibly re-engineered. As such, the engineering (e.g., design, modification, upgrade, maintenance, replacement, etc.) of the overall ride experience may benefit from characteristics of the modular attraction system 50. In particular, the technical effects may include, but are not limited to, flexibility (scalability, upgradeability, replaceability, convenience in maintenance, quick to deploy, etc.), cost effective (e.g., simplified planning and engineering), and predictability (e.g., easily tested and validated designs).

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. An attraction system, comprising:
a plurality of game systems configured to coordinate generation and rendering of an augmented reality (AR) image, a virtual reality (VR) image, or both, between the plurality of game systems to provide a game shared between the plurality of game systems, wherein the plurality of game systems is communicatively coupled in a manner that allows for removal and replacement of at least one game system of the plurality of game systems from the attraction system without affecting operation of remaining game systems of the plurality of game systems.

2. The attraction system of claim 1, wherein each game system of the plurality of game systems is configured to provide the AR image, the VR image, or both, via a respective visual experience generator device of each game system, wherein the respective visual experience generator device comprises a head mounted display.

3. The attraction system of claim 1, wherein the attraction system comprises a plurality of seats configured to receive a plurality of passengers, and wherein an individual game system of the plurality of game systems is associated with one or more seats of the plurality of seats.

4. The attraction system of claim 3, wherein the plurality of seats comprises a group of seats, and wherein the individual game system of the plurality of game systems is associated with the group of seats.

5. The attraction system of claim 1, comprising a ride vehicle having the plurality of game systems.

6. The attraction system of claim 1, wherein the at least one game system of the plurality of game systems comprises an identification system configured to retrieve identifying information relating to a passenger of the attraction system, and wherein the at least one game system is configured to render game content based on the identifying information.

7. The attraction system of claim 1, wherein individual game systems of the plurality of game systems are communicatively coupled to one another via a wireless communication protocol.

8. The system of claim 1, wherein the AR image, the VR image, or both are the same image between the plurality of game systems.

9. The system of claim 8, wherein the plurality of game systems is configured to coordinate the generation and the rendering to provide the same image with respective adjustments for each game system of the plurality of games systems based on a respective position, a respective orientation, a respective gaze direction, or any combination thereof for each game system of the plurality of games systems.

10. The system of claim 1, wherein the AR image comprises an AR feature overlaid onto a real environment, and the plurality of game systems are configured to coordinate the generation and the rendering of the AR image to provide the AR feature as a same AR feature across the plurality of game systems to provide the game shared between the plurality of game systems.

11. The system of claim 1, wherein the VR image comprises a VR feature in a virtual environment, and the plurality of game systems are configured to coordinate the generation and the rendering of the VR image to provide the VR feature as a same VR feature across the plurality of games systems to provide the game shared between the plurality of game systems.

12. A ride vehicle for an attraction system, the ride vehicle comprising:
an on-board system having a plurality of game systems configured to coordinate generation and rendering of an augmented reality (AR) image, a virtual reality (VR) image, or both, to a plurality of passengers of the ride vehicle as part of a multi-player experience shared between the plurality of game systems, wherein the plurality of game systems is communicatively coupled in a manner that allows for removal of at least one game system of the plurality of game systems from the ride vehicle without affecting operation of remaining game systems of the plurality of game systems to present the multi-player experience.

13. The ride vehicle of claim 12, wherein the ride vehicle comprises a plurality of seats configured to receive the plurality of passengers, wherein the on-board system is configured to adjust the AR image, the VR image, or both, based on user inputs received from the plurality of passengers to adjust the multi-player experience, and wherein an individual game system of the plurality of game systems is associated with one or more seats of the plurality of seats.

14. The ride vehicle of claim 12, wherein the plurality of game systems is communicatively coupled in a manner that allows for replacement of the at least one game system of the plurality of game systems with another game system without affecting operation of remaining game systems of the plurality of game systems to present the multi-player experience.

15. The ride vehicle of claim 12, wherein each game system of the plurality of game systems is configured to provide the AR image, the VR image, or both, via a respective visual experience generator device.

16. The ride vehicle of claim 12, comprising an off-board system communicatively coupled to the on-board system, wherein the off-board system is configured to provide off-board show effects in coordination with the multi-player experience shared between the plurality of game systems.

17. The ride vehicle of claim 12, wherein the on-board system comprises an on-board game server communicatively coupled to the plurality of game systems, and wherein the on-board game server is configured to receive and distribute user inputs to the plurality of game systems.

18. The system of claim 12, wherein the AR image, the VR image, or both are the same image between the plurality of game systems.

19. The system of claim 18, wherein the plurality of game systems is configured to coordinate the generation and the rendering to provide the same image for each game system of the plurality of games systems with respective adjustments based on a respective position, a respective orientation, a respective gaze direction, or any combination thereof for each game system of the plurality of games systems.

20. The system of claim 12 wherein the AR image comprises an AR feature overlaid onto a real environment, and the plurality of game systems are configured to coordinate the generation and the rendering of the AR image to provide the AR feature as a same AR feature across the plurality of game systems to provide the game shared between the plurality of game systems.

21. The system of claim 12, wherein the VR image comprises a VR feature in a virtual environment, and the plurality of game systems are configured to coordinate the generation and the rendering of the VR image to provide the VR feature as a same VR feature across the plurality of games systems to provide the game shared between the plurality of game systems.

22. An attraction system, comprising:
a ride vehicle having an on-board system comprising a plurality of game systems, wherein each game system of the plurality of game systems is configured to provide an augmented reality (AR) experience, a virtual reality (VR) experience, or both, within a game shared between the plurality of game systems, wherein the ride vehicle comprises a group of seats configured to receive a plurality of passengers, wherein an individual game system of the plurality of game systems is associated with the group of seats, and wherein the on-board system is configured to receive user inputs from the plurality of passengers and to, based on the user inputs, adjust AR events, VR events, or both occurring during the game shared between the plurality of game systems.

23. The attraction system of claim 22, wherein the plurality of game systems are communicatively coupled to one another in a manner that allows for removal of the individual game system from the attraction system without affecting operation of remaining game systems of the plurality of game systems.

24. The attraction system of claim 22, wherein the on-board system comprises one or more input devices configured to receive the user inputs from the plurality of passengers, wherein the one or more input devices comprise one or more buttons, one or more knobs, one or more touchscreens, one or more joysticks, one or more actuatable elements, one or more steering controls, one or more triggers, or any combination thereof.

* * * * *